Nov. 27, 1928.

G. H. CALLAHAN 1,693,367

HOSE COUPLING

Filed Aug. 12, 1926

INVENTOR
George H. Callahan
By W. W. Williamson Atty.

Nov. 27, 1928.

G. H. CALLAHAN 1,693,367

HOSE COUPLING

Filed Aug. 12, 1926   3 Sheets-Sheet 2

INVENTOR
George H. Callahan
By W. W. Williamson
Atty.

Nov. 27, 1928.  1,693,367
G. H. CALLAHAN
HOSE COUPLING
Filed Aug. 12, 1926  3 Sheets-Sheet 3
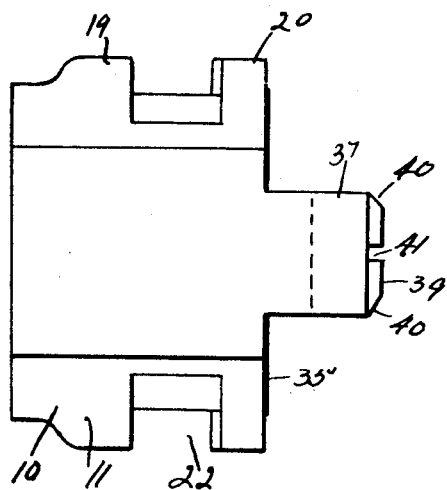
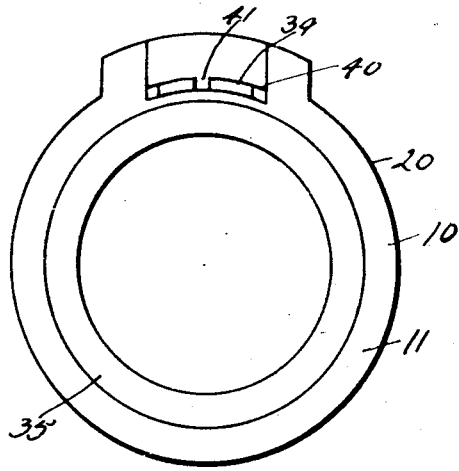
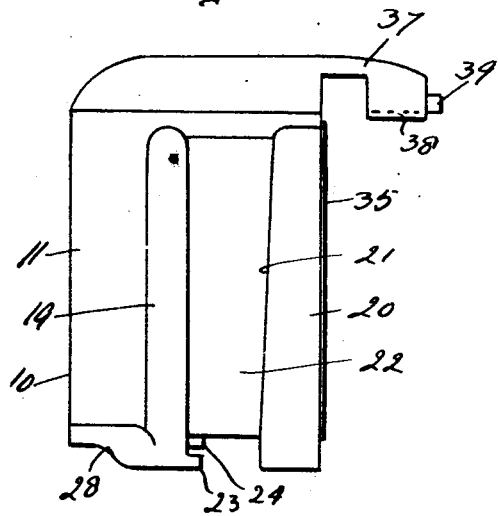
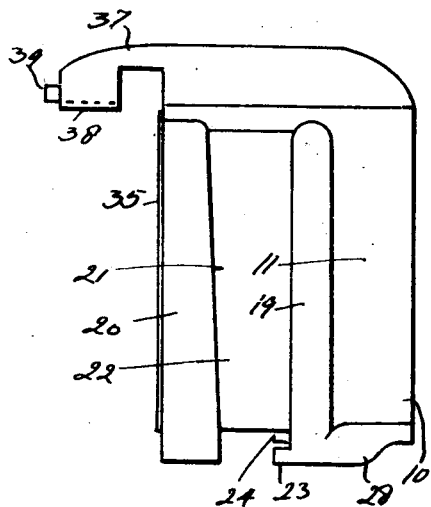
INVENTOR
George H. Callahan
By W. W. Williamson
Atty.

Patented Nov. 27, 1928.

1,693,367

UNITED STATES PATENT OFFICE.

GEORGE H. CALLAHAN, OF GLOUCESTER, NEW JERSEY.

HOSE COUPLING.

Application filed August 12, 1926. Serial No. 128,750.

My invention relates to new and useful improvements in a hose coupling, and more particularly to that class of coupling used for temporarily fastening together sections of fire hose, and has for its primary object to provide an exceedingly simple and effective device of this character which may be readily coupled or uncoupled in order to expedite the manipulation of the hose and one that will be efficient in operation.

Another object of the invention is to provide hose coupling in which the members are identical in construction, permitting attachment to each other by a rotary motion in either direction.

A further object of the invention is to provide a packing means for each coupling member in the form of an elastic gasket so shaped and positioned in the members as to coact when said members are fastened together whereby the seal will be augmented as the interior pressure is increased.

A still further object of the invention is to provide for latching the tongues of the members when the latter are in their operative positions.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 7, is a side elevation of a slightly modified form of one of the members.

Fig. 8, is an end view thereof.

Fig. 9, is a side elevation at right angles to Fig. 7.

Fig. 10, is a view similar to Fig. 9 looking at the opposite side thereof.

Figure 1:
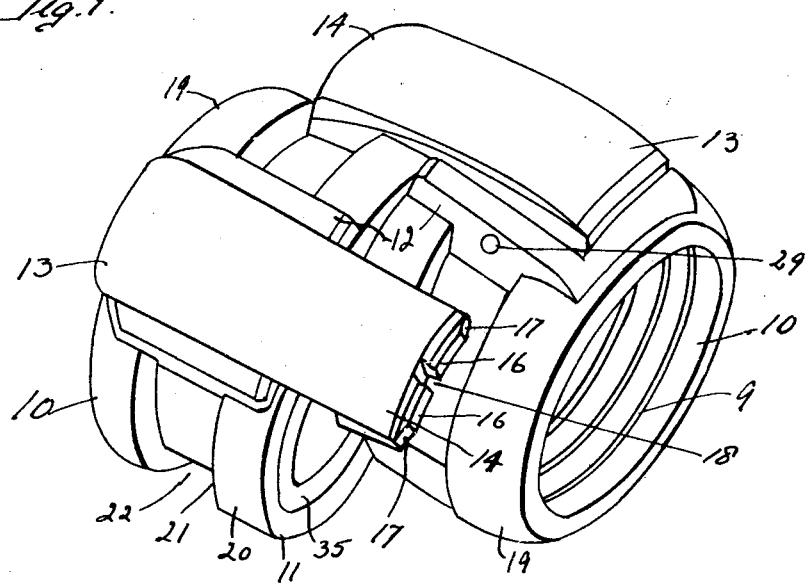
Fig. 1, is a perspective view of a hose coupling embodying my invention showing the two members about to be fastened to each other.

In carrying out my invention as herein embodied, particular reference being had to Figs. 1 to 6 inclusive, the reference numeral 10 denotes a coupling member, two of which in combination are used to make up the complete hose coupling as shown in Fig. 1.

Each of the members comprises a cylindrical body portion 11 provided with suitable interior corrugations 9 for connection in the usual and well-known manner to the end of a hose. At a suitable position on the body is formed a housing 12 for the reception of the tail piece 13 of the latch 14, said latch having an overhanging portion projecting beyond the working face of the coupling member, and from this overhanging part projects a nose 15. Projecting outwardly from the nose 15 is a lip 16 beveled at both ends, as indicated at 17 in Fig. 3, and said lip is provided with a notch or recess 18 intermediate its ends.

About the body in spaced relation are arranged a pair of flanges or ribs 19 and 20, and the inner face of the rib or flange 20 is preferably inclined, as at 21 from the housing 12 in opposite directions to a point or points substantially opposite said housing, and the space between the two ribs, or flanges forms a channel to receive the nose 15 of the coacting coupling member.

Projecting into the channel 22 from the rib or flange 19 is a ledge 23 positioned diametrically opposite the housing 12, and this ledge will overlie the lip 16 of a coacting coupling member when two of such members are coupled or joined together, and when properly positioned in operative condition, the catch 24 will enter the recess 18 due to the action of the spring 25, as said catch may be drawn inward against the action of said spring through the medium of the finger piece 26, or its equivalent. While the catch may be mounted on the coupling member in any suitable manner, I have illustrated the catch and its associate spring located in a barrel 27, and the latter fixed within the hole in the coupling member in the region of the ledge 23, while the finger piece is partially housed between the panels 28.

In this particular embodiment of my invention I have shown the latch 14 as pivoted within the housing 12 by means of a pin 29 passing through the arms 30 in the side walls of the housing, while the nose of said housing is pressed inward towards the axial center of its coupling member by a spring 31 of any suitable or desirable construction.

Figure 2:
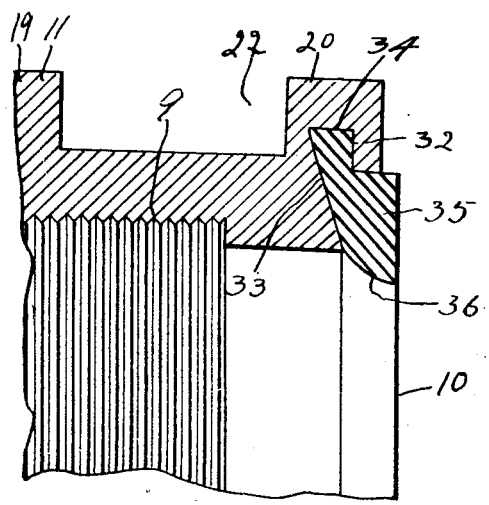
Fig. 2, is an enlarged longitudinal sectional view of one of the members.
Figure 3:
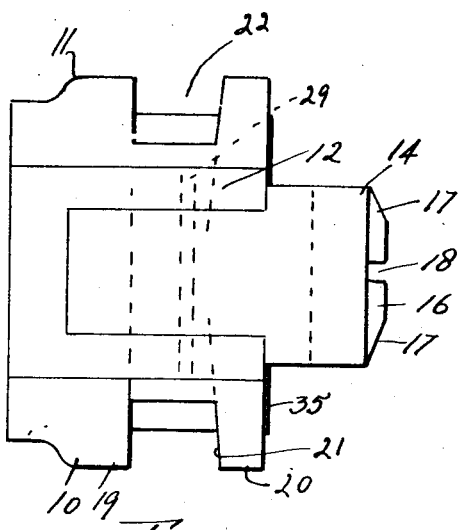
Fig. 3, is a side elevation of one of the members.
Figure 4:
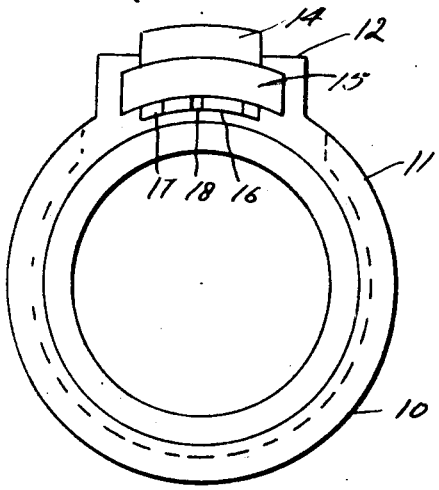
Fig. 4, is an end view thereof.
Figure 5:
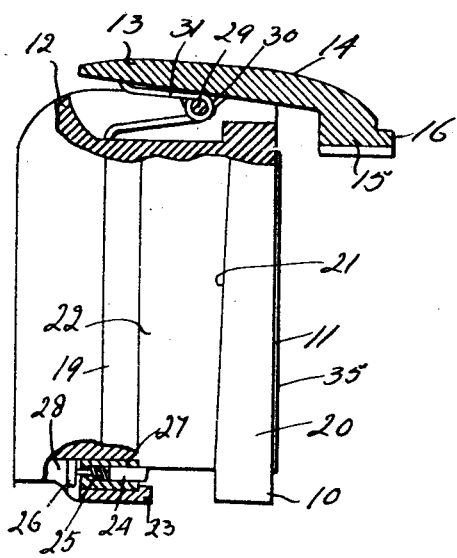
Fig. 5, is a sectional side elevation at right angles to Fig. 3.
Figure 6:
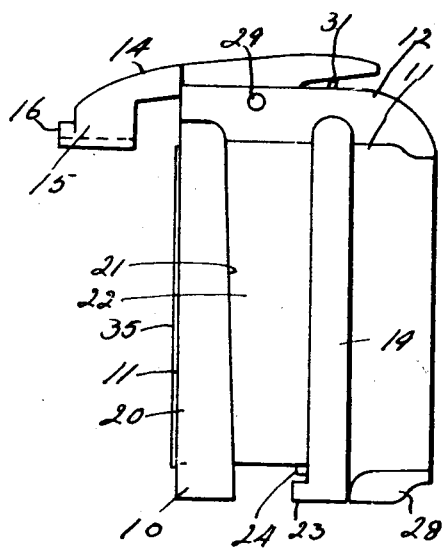
Fig. 6, is a side elevation of the member opposite to the view shown in Fig. 5.

On the inside of the coupling member adjacent its working face is formed a circumferential groove 32, Fig. 2, provided with a beveled surface 33. In this groove is fitted the flange 34 of the compressible ring gasket, one surface of the gasket being arcuate in cross section as indicated at 36. When the ring gasket is in place in the coupling member, the working face of said gasket extends slightly beyond the working face of the coupling member, so that when the gaskets of two coacting members are brought together and the coupling members secured to each other, said gaskets will be compressed for an obvious reason.

In coupling two of the coupling members together they are first positioned slightly off each other's centers slightly, so as to permit the nose 15 of the catch of one member to enter the channel 22 of the cooperating member, after which the two members are aligned and a rotary motion imparted thereto, which will cause the nose of each catch to travel through the channel of the cooperating member until the lip 16 passes under the ledge 23. During the last part of this action the beveled end of the lip will ride over the end of the catch 24 and depress it, but as soon as the catch aligns with the recess 18 in the lip, said catch will enter the recess and lock the coupling members against further rotary movement, until it is desired to uncouple the members, at which time the catch between each member may be withdrawn by taking hold of the finger piece 26.

As the coupling members are rotated relative to each other, the inner edge of the nose 15 of one member will ride along the beveled surface 21 of the cooperating member thus drawing the two members toward each other and compressing the gaskets.

Where the user does not care to give the coupling members the full rotary motion necessary in fastening them together as above described, the tail pieces 13 of the latches may be depressed against the action of the springs so that the noses of said latches will pass over the flanges 11.

The springs also give a certain leeway of action during the coupling operations so that the catches may ride over any unevennesses that occur in the members.

The arcuate portions 36 of the gaskets overhanging the bores of the coupling members are in the path of travel of the fluid passing through the hose, and where the pressure of this fluid is sufficient, the inner edges of the gaskets will be bent in the direction of the flow of the fluid, and in actual practice this has been found to produce an exceedingly efficient seal, and during certain tests it was discovered that as the internal pressure was increased, the more efficient the seal became.

In Figs. 7 to 10 inclusive, I have shown a slightly modified embodiment of my invention in which the latch 37 is formed as a permanent integral part of the body of the coupling member projecting from the working face thereof and provided with a nose 38 and a lip 39, the latter being beveled at both ends indicated by 40, and having an intermediate recess 41 for coaction with the latch 24, the same as described in connection with the other formation.

The remaining parts of the invention being identical with those in the preferred form of the coupler, they will be designated by the same reference numerals, and further description is believed unnecessary.

Of course I do not wish to be limited to the exact details of construction as herein shown as these may be varied within the limits of the appended claims without departing from the spirit of my invention.

Having thus fully described my invention, what I claim as new and useful is:

1. A hose coupling comprising a pair of cooperating members, each including a cylindrical body having a circular groove on the inside thereof adjacent the working face; a compressible gasket mounted in the groove and having portions projecting into the bore of the member and outside of the working face thereof; circumferential ribs on the outside of said body, the one adjacent the working face having its rear side beveled in opposite directions; a latch having a portion projecting from the body for registration with the space between the ribs of the cooperating member; a lip projecting from the latch; a ledge projecting from the rear rib of the body into the space between the two ribs and inside of which the lip on the latch of the cooperating member is to enter; and a catch in the region of the ledge for coaction with a recess in the lip of the latch of the cooperating member for the purposes stated.

2. The structure set forth in claim 1 wherein a spring is provided in operative relation to the latch for normally forcing the outer end of the latter towards the axial center of the member.

3. A hose coupling comprising a pair of cooperating members each including a cylindrical body having a circular groove on the inside thereof adjacent the working face, a gasket mounted inside the groove, circumferential ribs on the outside of said body, the one adjacent the working face having its rear side beveled longitudinally in opposite directions, a single pivoted latch mounted on the body having a portion projecting beyond said body and co-operating with the beveled face of the rib on the other co-operating member, a lip carried by the projecting portion of the latch and adapted to enter a recess in the rear rib of the body of said other co-operating member, and a catch on the cooperating hose coupling member to hold the latch against accidental displacement.

In testimony whereof, I have hereunto affixed my signature.

GEORGE H. CALLAHAN.